May 13, 1952 J. A. MORICCO ET AL 2,596,710

REMOVABLE PANEL FRAME FOR TELEVISION RECEIVING SETS

Filed Aug. 14, 1950

INVENTORS
JOHN A. MORICCO
GREGORY J. MORICCO
BY Zoltan Polachek
ATTORNEY.

Patented May 13, 1952 2,596,710

UNITED STATES PATENT OFFICE 2,596,710

REMOVABLE PANEL FRAME FOR TELEVISION RECEIVING SETS

John A. Moricco, Brooklyn, and Gregory J. Moricco, New York, N. Y.

Application August 14, 1950, Serial No. 179,284

4 Claims. (Cl. 312—7)

This invention relates to new and useful improvements in the construction of cabinets for television receivers.

Cabinets for television receivers are necessarily provided with a glass window in the front panel thereof through which the images formed on the fluorescent face of the cathode ray tube of the receiver can be observed. Heretofore such windows have been fixed in place so that it was required to remove the receiver chassis from the cabinet through a removable rear panel in order to clean the inner surface of the window and the face of the picture tube and to service the receiver.

One object of the invention is the provision of a front panel for such cabinets, having therein a readily removable window portion.

Another object of the invention is to construct and arrange said removable window portion so that when removed the cathode ray tube can be removed from the cabinet through the resultant opening.

Still another object of the invention is the provision of simple and effective means for locking the said portion in place and for concealing the edges of the same.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3, 4, 5, 6, 7, 8:
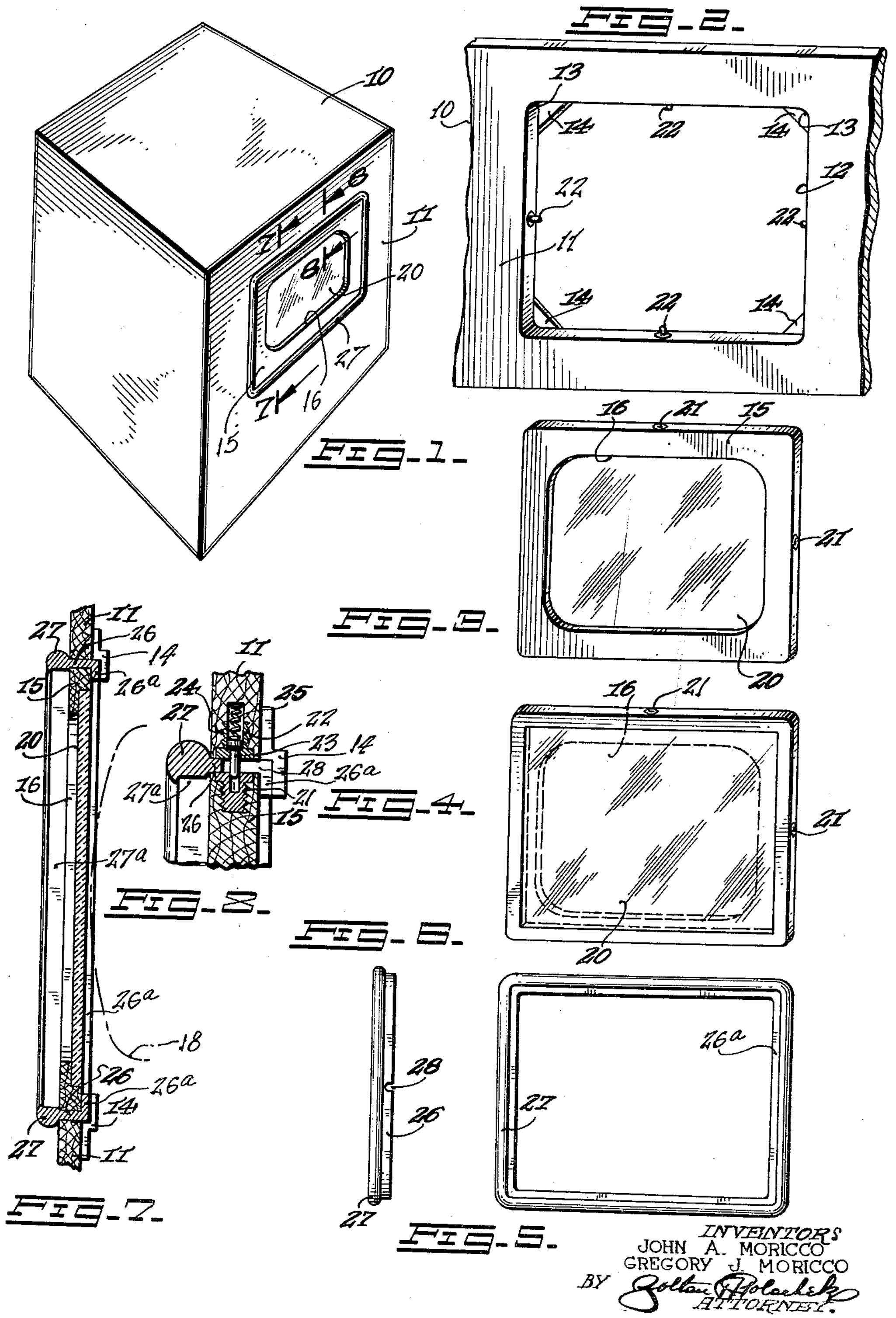
Fig. 1 is a perspective view of a television receiver having a cabinet formed in accordance with the invention.
Fig. 2 is a fragmentary enlarged perspective view of the front panel of the cabinet with the removable portion removed.
Fig. 3 is a front perspective view of the removable portion.
Fig. 4 is a rear perspective view of said removable portion.
Fig. 5 is a front detached view of an edging bead.
Fig. 6 is an edge view of said bead.
Fig. 7 is an enlarged sectional view on line 7—7 of Fig. 1.
Fig. 8 is an enlarged fragmentary sectional view on line 8—8 of Fig. 1.

The television receiver, according to the present invention includes a cabinet 10. The television receiver is shown on the drawing as a table model. It will be perceived, however, that the invention is applicable equally well to console type receivers. Referring also to Figs. 2, 3 and 4, it will be seen that the front panel 11 of the cabinet is provided with a large opening 12 which preferably is of rectangular outline with rounded corners 13. A limit stop 14 is secured to the inner face of panel 11 and overlaps each of the corners 13. Adapted to the opening 12 is a frame 15 having therein an opening 16 countersunk in such manner that it is of greater dimensions at the rear of the frame than at the front, see also Fig. 7. Thus, the frame 15 forms a mask for concealing the edges of the cathode ray tube 18, said mask also being utilized as a support against which a glass window pane 20 seated in the larger rear portion of the opening is cemented.

In order to secure the frame 15 in the opening 12, the edges of the frame 15 are provided each at the center thereof with the female component 21 of an ordinary bullet catch, and a male catch component 22 is provided at the center of each edge of the said opening, see Figs. 2, 3, 4 and 8. As best shown in Fig. 8, each female component 21 comprises a well sunk in the frame 15, and each male component 22 comprises a bullet-shaped member 23 mounted in a housing 24 and having a rounded outer end portion projected slightly into the said well by a spring 25.

According to the invention, the frame 15 is made slightly smaller than the opening 12 so that when the former is centered in the latter a small space is provided between the edges of the two. Adapted to this space is the tongue 26 of a substantially circularly cross sectioned metal bead 27, see Figs. 1, 5, 6 and 7, said tongue fitting tightly into said space and being concealed by said bead. In order to accommodate the members 23, the tongue 26 is provided with cutouts or open-ended slots 28, see also Fig. 8.

As illustrated in Figs. 5, 7 and 8, the inner edge of the tongue 26 of the metal bead 27 continues into a right angularly bent inner portion $26^a$ which is projected along the inner face of the frame 15 to insure that the frame will be pulled outward when outward pressures are applied to the metal bead. With this construction, the peripheral edges of the frame 15 are clamped between the adjacent faces of the metal bead 27 and the inner portion $26^a$ retaining the metal bead fixedly in position on the frame. Furthermore, the inner face of the metal bead is partially cut away at $27^a$, see particularly Fig. 8, so that a good finger grip can be had on the bead for pulling outward thereon for removing the frame 15.

It will be seen, therefore, that in the normal positions of the parts, see Figs. 1, 7 and 8, the frame 15, surrounded by tongue 26 is fitted tightly into the opening 12 with the rear face of the inwardly bent portion $26^a$ abutting the limit stops 14; and the members 23 extend through the slots 28 into the wells of the female components 21.

To clean the inner face of the glass window 20 or the face of tube 18, or to remove said tube from the cabinet for servicing of the receiver, all that is required is to pull outward on the beading 27 to remove the frame 15 by disengaging the catch components 21, 22.

To replace the frame, it may be seated within the tongue 26 and the whole pushed into the opening 12 to engage the catches 21, 22.

It is conceivable that the front panel 11 could be pivoted to the body of the television receiver along one edge so that the entire panel can be pivoted to an open position so that the inner face of the glass window and the face of the cathode ray tube can be cleaned or the tube removed for repair and replacement when necessary.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:

1. A cabinet for a television receiver including a front panel having therein a large rounded corner opening larger than the diameter of the picture tube of the receiver, a frame mounted in said openings, an opening in said frame countersunk to form a mask, a window pane mounted in the latter said opening and secured to said mask, a bead concealing the edges of said frame and the first said opening, a tongue projecting from said bead between said edges, and bullet catches for detachably securing together the adjacent edges of said frame and the first said openings.

2. A cabinet for a television receiver including a front panel having therein a large rounded corner opening larger than the diameter of the picture tube of the receiver, a frame mounted in said opening, an opening in said frame countersunk to form a mask, a window pane mounted in the latter said opening and secured to said mask, a bead concealing the edges of said frame and the first said opening, a tongue projecting from said bead between said edges, bullet catches for detachably securing together the adjacent edges of said frame and the first said opening, and an open end slot in said tongue to accommodate each said catch.

3. A cabinet for a television receiver including a front panel having therein a large rounded corner opening, a frame mounted in said opening, an opening in said frame, a window pane mounted in the latter said opening, a bead concealing the edges of said frame and the first said opening, a tongue projecting from said bead between the edges, and right angularly bent portions formed on the inner edges of said tongue and projected along the inner face of said frame.

4. A cabinet for a television receiver including a front panel having therein a large rounded corner opening, a frame mounted in said opening, an opening in said frame, a window pane mounted in the latter said opening, a bead concealing the edges of said frame and the first said opening, and a tongue projecting from said bead between said edges, said bead having its outer face cut away forming a finger grip.

JOHN A. MORICCO.
GREGORY J. MORICCO.

REFERENCES CITED

The following references are of record in the file of this patent:

UNITED STATES PATENTS

| Number | Name | Date |
| --- | --- | --- |
| 2,160,762 | Stenberg | May 30, 1939 |
| 2,224,287 | Busch | Dec. 10, 1940 |

OTHER REFERENCES

Wright, Abstract Ser. No. 719,175, published August 23, 1949.